United States Patent [19]
Mizuno

[11] Patent Number: 5,875,757
[45] Date of Patent: Mar. 2, 1999

[54] METHOD AND APPARATUS FOR CONTROLLING IDLE SPEED OF STRATIFIED CHARGE INJECTION ENGINE

[75] Inventor: Hiroyuki Mizuno, Toyota, Japan

[73] Assignee: Toyota Jidosha Kabushiki Kaisha, Toyota, Japan

[21] Appl. No.: 929,119

[22] Filed: Sep. 15, 1997

[30] Foreign Application Priority Data

Sep. 17, 1996 [JP] Japan ...................................... 8-244596

[51] Int. Cl.⁶ ...................................................... F02D 41/08
[52] U.S. Cl. ............... 123/295; 123/339.16; 123/339.23; 123/339.25
[58] Field of Search ..................................... 123/295, 305, 123/339.16, 339.17, 339.18, 339.23, 339.25, 339.26

[56] References Cited

U.S. PATENT DOCUMENTS

| | | | |
|---|---|---|---|
| 5,031,594 | 7/1991 | Morikawa | 123/295 |
| 5,628,290 | 5/1997 | Iida et al. | 123/305 |

FOREIGN PATENT DOCUMENTS

A-5-39736  2/1993  Japan .
A-7-166916  6/1995  Japan .

*Primary Examiner*—Tony M. Argenbright
*Attorney, Agent, or Firm*—Oliff & Berridge, PLC

[57] ABSTRACT

An apparatus for controlling idle speed of an engine is disclosed. The engine is able to perform stratified charge combustion and uniform charge combustion. A fuel injection valve directly injects fuel into the combustion chamber to perform either stratified charge combustion or uniform charge combustion in accordance with the running state of the engine. An automatic transmission is operably coupled to the engine to selectively load the engine. The engine power is increased for avoiding a decrease in the idle speed of the engine when the transmission starts to operate while the engine is idling. However, the power increase is delayed from when the transmission starts operating. The amount of fuel injected from a fuel injection valve is increased to increase power of the engine during stratified charge combustion. The amount of air supplied to the combustion chamber is increased to increase power of the engine during uniform charge combustion. The delay is longer during stratified charge combustion than during uniform charge combustion.

13 Claims, 6 Drawing Sheets

METHOD AND APPARATUS FOR CONTROLLING IDLE SPEED OF STRATIFIED CHARGE INJECTION ENGINE

BACKGROUND OF THE INVENTION

The present invention relates to an apparatus for controlling the idle speed of engines that perform stratified charge combustion and uniform charge combustion such as cylinder fuel injection type engines.

In a typical engine, fuel is injected into an intake port from a fuel injection valve to charge a mixture of fuel and air to the associated combustion chamber in a uniform manner. An intake passage is opened and closed by a throttle valve, which is operated by manipulating a gas pedal. The opening of the throttle valve adjusts the intake air amount (and ultimately the amount of uniformly mixed air and fuel) that is supplied to the combustion chambers of the engine. This controls engine power.

However, when performing uniform charge combustion, a high level of negative pressure is produced by the throttling action of the throttle valve. This increases pumping loss, which is generated when the mixture is drawn into the combustion chamber from the intake port. To attempt to solve this problem, stratified charge combustion has been proposed. In stratified charge combustion, the throttle valve is opened wide, and fuel is supplied directly into each combustion chamber. This provides a mixture having a relatively low air-fuel ratio in the vicinity of the ignition plug. As a result, ignitability is enhanced.

In such an engine, each combustion chamber is provided with a uniform charge fuel injection valve and a stratified charge fuel injection valve. The uniform charge injection valve uniformly disperses fuel into the combustion chamber and the stratified charge injection valve injects fuel toward the vicinity of the ignition plug. When the engine load is small, fuel is injected from the stratified charge injection valve. Thus, the fuel is supplied in a concentrated manner about the ignition plug. The throttle valve is almost fully opened to perform stratified charge combustion. This improves fuel efficiency and decreases pumping loss.

Incidentally, several techniques for controlling idle speed of engines have been proposed. The idle speed of current engines is generally set relatively low for enhancing fuel economy. In an engine provided with an automatic transmission, shifting the selector lever from a non-drive position to a drive position increases the engine load and thus lowers the idle speed. The decrease of the idle speed is likely to stall the engine. Therefore, the idle speed controlling techniques control the engine to increase the power when the engine load is increased thereby preventing the idle speed from dropping. This stabilizes the idle speed.

Japanese Unexamined Patent Publication No. 5-39736 discloses a technique for controlling the idle speed. An idle speed controlling apparatus according to the publication inputs a signal that indicates an increase in the engine load (load signal) when a selector lever is shifted from a non-drive position to a drive position. After a predetermined period of time (delay time) has elapsed since inputting the signal, the apparatus controls the engine to increase the power. Actual increase of the engine load caused by shifting the selector lever takes place with a delay after the apparatus inputs a load signal. The apparatus of the Japanese publication is designed to deal with this delay. That is, the apparatus increases the power of the engine in accordance with the delay. Also, the apparatus changes the length of the delay time in accordance with the position of the selector lever (drive position, first gear position) when the lever is shifted from a non-drive position to a drive position.

However, employing the idle speed controlling apparatus of the above publication a stratified charge combustion engine, causes the following problems. When stratified charge combustion is performed, the throttle valve is widely open. Therefore, the power of the engine is increased by increasing the amount of fuel injection without changing the amount of intake air. Contrarily, when uniform combustion is performed, the power of the engine is increased by increasing the amount of intake air by enlarging the opening of the throttle valve (or an idle speed control valve). At this time, the amount of fuel injection is also increased for maintaining the air-fuel ratio.

As described above, the engine power is increased differently when stratified charge combustion is performed from when uniform charge combustion is performed. Accordingly, when the engine is commanded to increase the power, the time lag between inputting the command signal and the actual power increase is different when stratified charge combustion is performed from when uniform charge combustion is performed. Specifically, when stratified charge combustion is performed, the power increase of the engine is completed in a relatively short period of time after the command signal is inputted to the engine because only the injection fuel amount into the combustion chambers is increased. On the other hand, when uniform charge combustion is performed, the opening of the throttle valve (or the opening of the idle speed control valve) is increased and then the increased amount of air, which corresponds to the increase of the valve's opening, must flow into the combustion chamber from the throttle valve. Therefore, the time period between inputting a command for increasing power and the resulting power increase is longer in uniform charge combustion than in stratified charge combustion.

If the time period between the input of a command for increasing engine power and the resulting increase of the engine power is short, the engine power may be increased before engine the load is increased. In this case, the idle speed of the engine is increased, and the subsequent increase of the engine load results in a shock to the engine. This causes the idle speed to drop abruptly. If the time period is excessively long, on the other hand, the engine load may be increased before the power of the engine is increased. The increased load causes the idle speed to drop before the engine power is increased. This may stall the engine.

SUMMARY OF THE INVENTION

Accordingly, it is an objective of the present invention to provide an apparatus for controlling and stabilizing the idle speed of a stratified charge combustion engine.

To achieve the foregoing and other objectives and in accordance with the purpose of the present invention, an apparatus for controlling idle speed of an internal combustion engine is provided. The engine is able to perform stratified charge combustion, in which the air-fuel ratio varies in the combustion chamber, and uniform charge combustion, in which the air-fuel mixture is uniform in the combustion chamber. A loading mechanism is operably coupled to the engine to selectively load the engine. The controlling apparatus includes supplying means, increasing means, detecting means and controlling means. The supplying means supplies fuel to the combustion chamber to perform either stratified charge combustion or uniform charge combustion in accordance with the running state of the engine. The increasing means increases power of the engine to suppress a decrease in the idle speed of the engine. The detecting means detects when the loading mechanism starts to operate while the engine is idling. The controlling means actuates the increasing means to increase power of the engine after the detecting means detects that the loading mechanism starts operating. The controlling means delays actuating the increasing means during stratified charge combustion relative to a time when it starts actuating the increasing means during uniform charge combustion.

The present invention may also be embodied as a method for controlling idle speed of an internal combustion engine that is able to perform stratified charge combustion, in which the air-fuel ratio varies in the combustion chamber, and uniform charge combustion in which the air-fuel mixture is uniform in the combustion chamber. A loading mechanism is operably coupled to the engine to selectively load the engine. Either stratified charge combustion or uniform charge combustion is performed in accordance with the running estate of the engine. An increasing means is actuated for increasing power of the engine to suppress a decrease in the idle speed of the engine after operation of the loading mechanism is detected while the engine is idling. Actuation of the increasing means is delayed during stratified charge combustion relative to that of uniform charge combustion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

One embodiment of an apparatus for controlling idle speed in a stratified charge combustion engine according to the present invention will now be described with reference to FIGS. 1 to 5.

Figure 1:
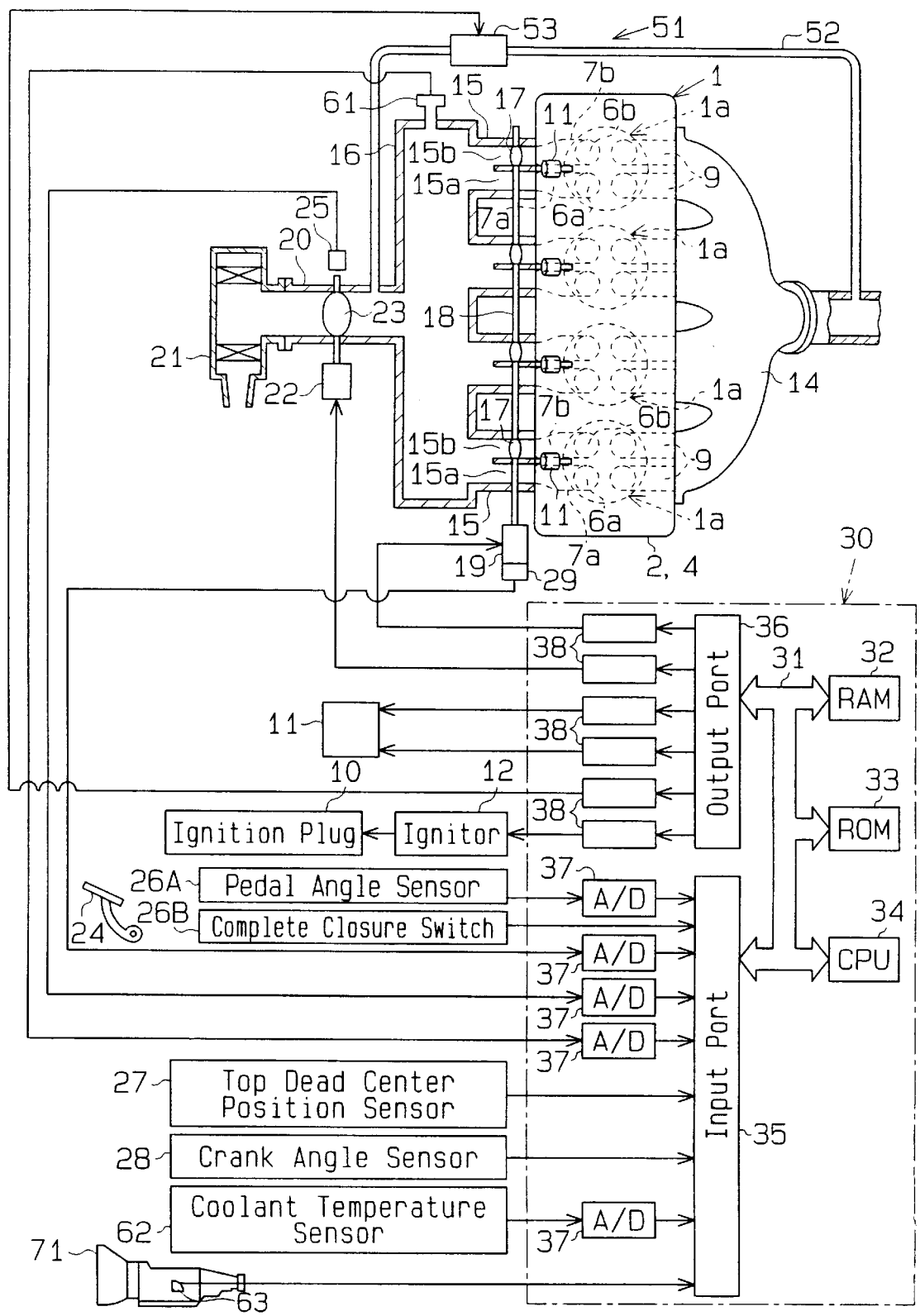
FIG. 1 is a diagrammatic view showing an apparatus for controlling the idle speed of a stratified charge combustion engine according to a first embodiment of the present invention.
Figure 2:
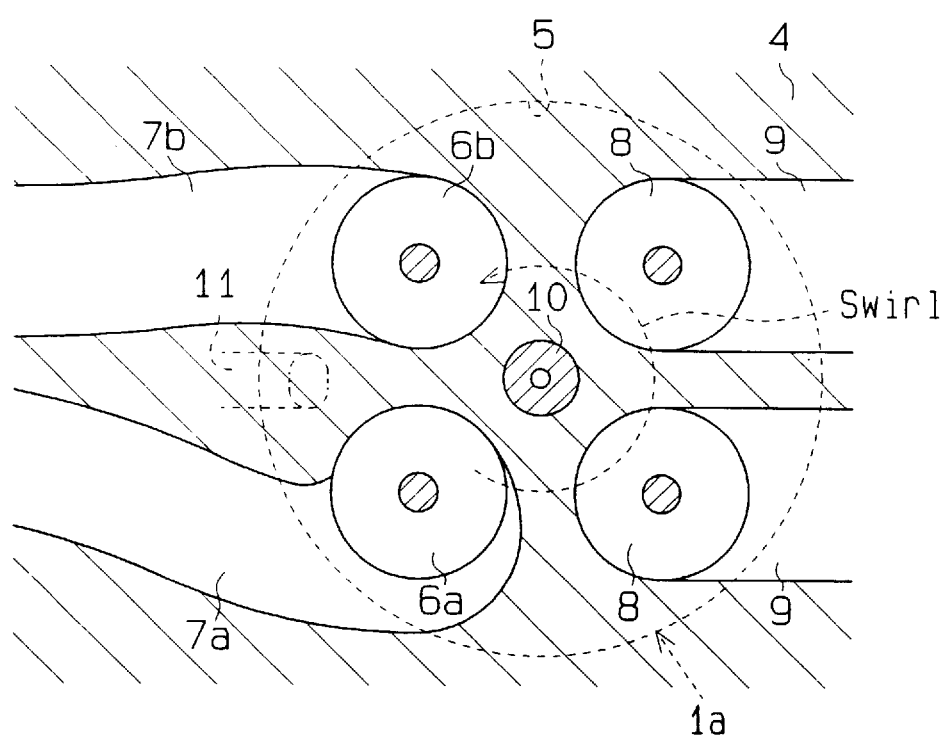
FIG. 2 is an enlarged diagrammatic cross-sectional view showing a cylinder of the engine of FIG. 1.

FIG. 1 illustrates an apparatus for controlling fuel injection in a cylinder injection type engine employed in a vehicle. As shown in FIG. 1, an engine 1 is provided with four cylinders 1a. The structure of the combustion chamber of each cylinder 1a is shown in FIG. 2. The engine 1 has a cylinder block 2 that accommodates pistons. The pistons are reciprocated in the cylinders 1a of the cylinder block 2. A cylinder head 4 is arranged on top of the cylinder block 2.

A combustion chamber 5 is defined between each piston and the cylinder head 4. Four valves are provided for each cylinder 1a. The four valves include a first intake valve 6a, a second intake valve 6b, and two exhaust valves 8. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a straight manner. Ignition plugs 10 are arranged at the middle of the cylinder head 4 to face the combustion chambers 5. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a.

In this embodiment, each injection valve 11 directly injects fuel into the associated cylinder 1a when either stratified charge combustion or uniform charge combustion is performed. When stratified charge combustion is performed, the valve 11 injects fuel into the combustion chamber 5 at the final stage of each compression stroke. The injected fuel is supplied in a concentrated manner about the ignition plug 10 and burned. At this time, a throttle valve 23, which will be discussed below, is fully closed. When uniform charge combustion is performed, on the other hand, the valve 11 injects fuel into the combustion chamber 5 during the intake stroke of the associated piston. The injected fuel is mixed with air introduced into the combustion chamber 5 from the intake ports 7a, 7b and is burned.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor (or a DC motor) 19 by a common shaft 18. The step motor 19 is controlled by signals sent from an electronic control unit (ECU) 30, which will be discussed later. The step motor 19 may be replaced with an actuating member controlled by the negative pressure in the intake ports 7a, 7b.

The surge tank 16 is connected to an air cleaner 21 through an intake duct 20. A throttle valve 23, which is opened and closed by a step motor (or a DC motor) 22, is arranged in the intake duct 20. The ECU 30 sends signals to drive the step motor 22 for opening and closing the throttle valve 23. The throttle valve 23 adjusts the amount of intake air that passes through the intake duct 20 and enters the combustion chambers 5. In this embodiment, the intake duct 20, the surge tank 16, the first intake passage 15a and the second intake pipe 15b constitute an intake path. A throttle sensor 25 is arranged in the vicinity of the throttle valve 23 to detect the opening angle (throttle angle TA) of the valve 23.

The exhaust ports 9 of each cylinder 1a are connected to an exhaust manifold 14. After combustion, the exhaust gas is sent to an exhaust pipe (not shown) through the exhaust manifold 14.

The engine 1 is provided with a conventional exhaust gas recirculation (EGR) mechanism 51 that includes an EGR passage 52 and an EGR valve 53 arranged in the EGR passage 52. The EGR passage 52 communicates a part of the intake duct 20 at the downstream side of the throttle valve 23 with an exhaust duct connected to the exhaust manifold 14. The EGR valve 53 includes a valve seat, a valve body, and a step motor (all of which are not shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The EGR valve 53 controls the recirculation amount of the exhaust gas.

The ECU 30 is a digital computer provided with a random access memory (RAM) 32, a read only memory (ROM) 33, a central processing unit (CPU) 34, which is a microprocessor, an input port 35 and an output port 36. A bidirectional bus 31 connects the RAM 32, the ROM 33, the CPU 34, the input port 35, and the output port 36 to one another.

An acceleration pedal 24 is connected to a pedal angle sensor 26A. The pedal angle sensor 26A generates voltage proportional to the degree of depression of the acceleration pedal 24. This enables the acceleration pedal depression amount ACCP to be detected. The voltage outputted by the pedal angle sensor 26A is inputted into the input port 35 by way of an analog-to-digital (A/D) converter 37. The acceleration pedal 24 is also provided with a complete closure switch 26B, which detects whether the acceleration pedal 24 is not pressed at all. The closure switch 26B outputs a signal set at one when the acceleration pedal 24 is not pressed at all and outputs a signal set at zero when the acceleration pedal 24 is pressed. The output voltage of the closure switch 26B is inputted to the CPU 34 via the input port 35.

A top dead center position sensor 27 generates an output pulse when, for example, the piston in the first cylinder 1a reaches the top dead center position. The output pulse is inputted into the CPU 34 via the input port 35. A crank angle sensor 28 generates an output pulse each time a crankshaft of the engine 1 is rotated, for example, by a crank angle CA of 30 degrees. The output pulse sent from the crank angle sensor 28 is inputted into the CPU 34 via the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is inputted into the CPU 34 via an A/D converter 37 and the input port 35. The throttle sensor 25 detects the throttle angle TA. The signal output of the throttle sensor 25 is inputted into the CPU 34 via an A/D converter 37 and the input port 35.

An intake pressure sensor 61 is provided to detect the pressure in the surge tank 16 (intake pressure PIM). A coolant temperature sensor 62 is provided to detect the temperature of the engine coolant (coolant temperature THW). The signal outputs of the intake pressure sensor 61 and the coolant temperature sensor 62 are inputted into the CPU 34 via A/D converters 37 and the input port 35.

An automatic transmission 71 is operably coupled to the engine 1. The transmission 71 has a neutral start switch 63. The neutral start switch 63 detects whether the selector lever is in a neutral range, which includes the neutral and parking positions. The switch 63 outputs a neutral signal NSW set at zero when the selector lever is in the neutral range and outputs a neutral signal NSW set at one when the selector lever is in a drive position.

The running condition of the engine 1 is detected by the sensors 25, 26A, 27, 28, 29, 61 and 62 and the switches 26B and 63.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–63.

Figure 3:
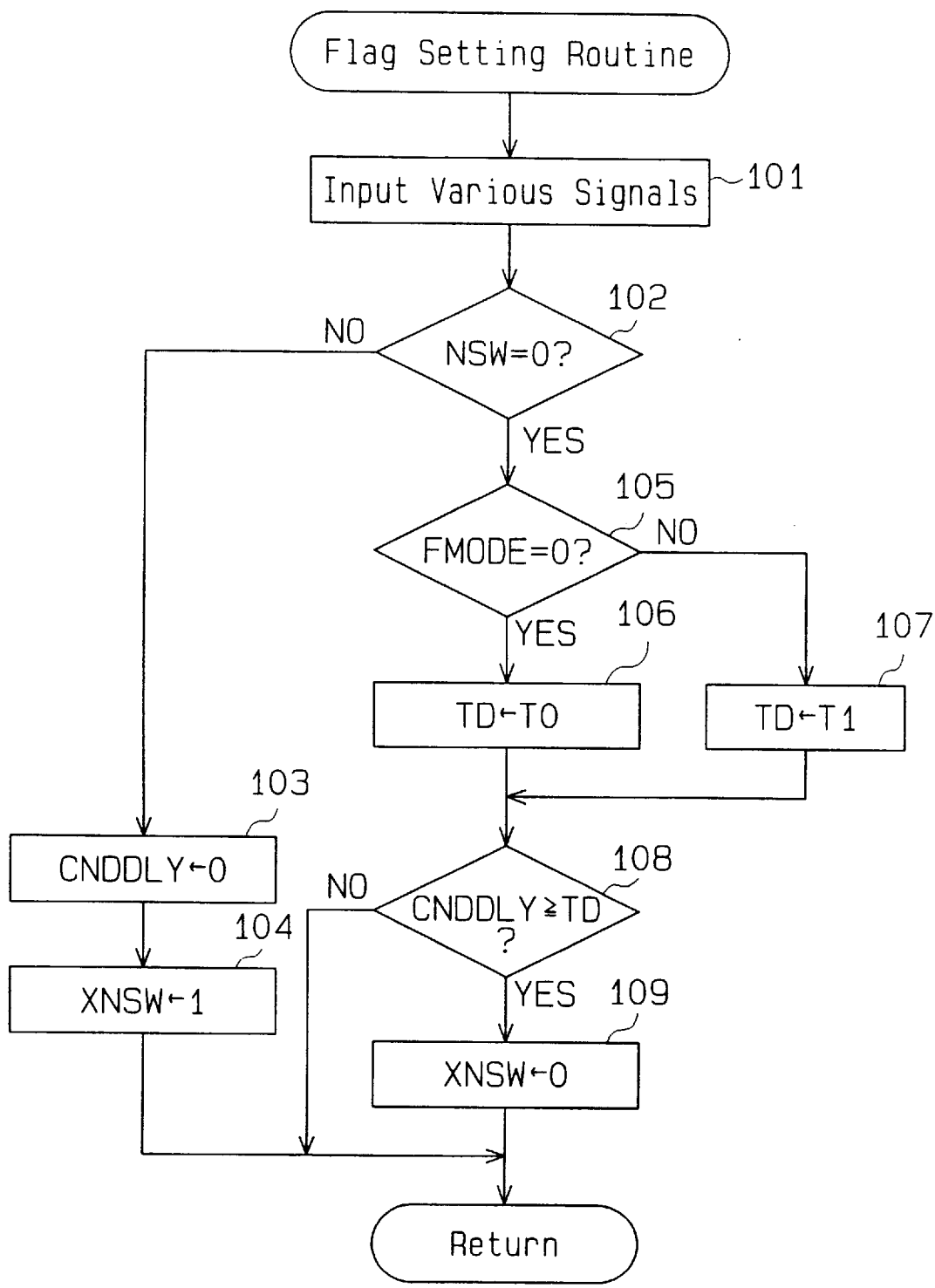
FIG. 3 is a flowchart illustrating a flag setting routine executed by an ECU.
Figure 4:
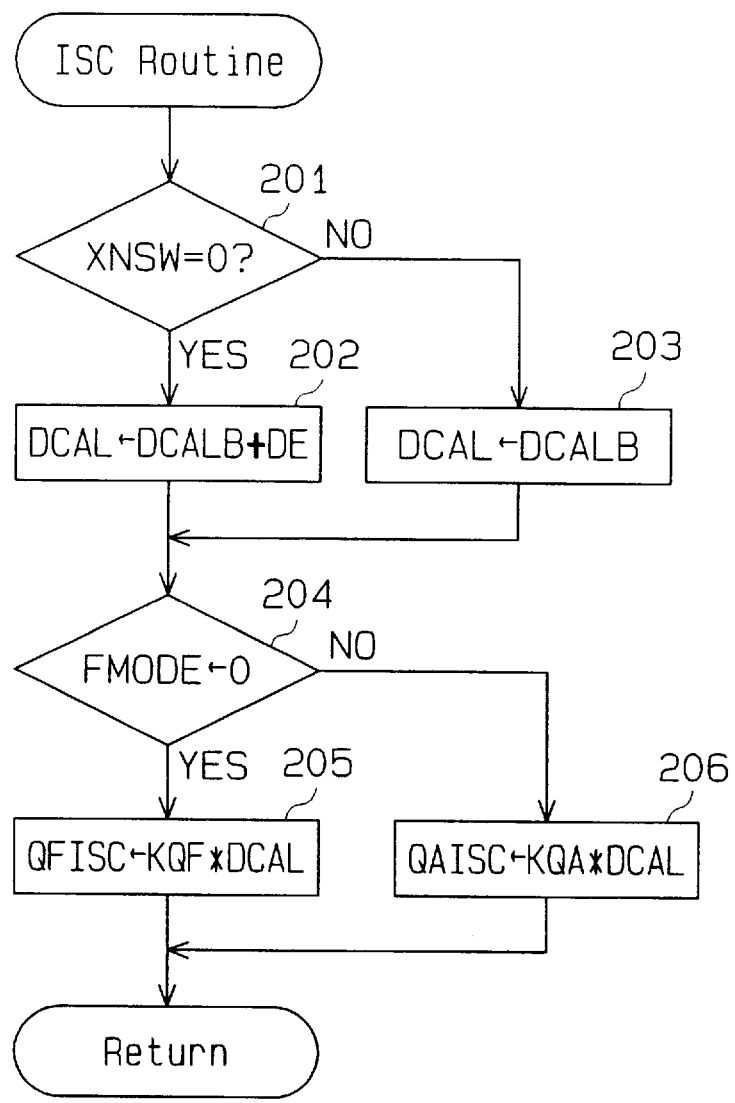
FIG. 4 is a flowchart illustrating an idle speed control routine executed by the ECU.

Control programs performed by the ECU 30 will now be described with reference to the flowcharts shown in FIGS. 3 and 4. FIG. 3 is a flowchart showing a routine for setting a flag XNSW, which indicates whether an "idle up" operation is required. The flag XNSW is used when the idle speed is controlled by manipulating the throttle valve 23 (the step motor 22) and the injection valves 11.

The "idle up" operation in this embodiment does not refer to an actual increase of the idle speed. However, the "idle up" operation refers to the suppression of a decrease in the idle speed when the load on the engine 1 increases. Specifically, in the "idle up" operation, the idle speed is increased by at least the amount of decrease caused by the engine load increase. In other words, the "idle up" refers to an increase of the power of the engine 1 for preventing the idle speed from being decreased by the increased engine load.

When entering the routine, the ECU 30 inputs signals indicating the current state of the engine 1 such as the engine speed NE, the acceleration pedal depressed amount ACCP, the neutral position signal NSW and others from the sensors 25–29 and 61–63 at step 101. The ECU 30 performs either the stratified charge combustion or the uniform charge combustion based on the inputted signals.

In step 102, the ECU 30 determines whether the neutral position signal NSW inputted in the current routine has a value of zero. If the signal NSW is not zero but one, the ECU 30 judges that the selector lever is currently in the neutral range and that the load of the automatic transmission 71 is not being applied to the engine 1. The ECU 30 then proceeds to step 103.

At step 103, the ECU 30 clears a counter value CNDDLY in a delay counter to zero. The delay counter increments the counter value CNDDLY for every predetermined time interval (for example 32 milliseconds). Thus, if the selector lever is in the neutral range, the counter value CNDDLY in the delay counter is maintained at zero.

At step 104, the ECU 30 sets the flag XNSW to one. The flag XNSW indicates whether an "idle up" operation is needed. Specifically the flag XNSW has the value of zero when the "idle up" operation is required, and has the value of one when the "idle up" operation is not required. After step 104, the ECU 30 temporarily terminates the subsequent processing. Thus, the "idle up" operation is not performed while the selector lever of the automatic transmission 71 is in the neutral range.

If the neutral signal NSW is zero in step 102, the ECU 30 judges that the selector lever is at the drive position and that the load of the automatic transmission 71 will be applied on the engine 1. The ECU 30 then proceeds to step 105.

At step 105, the ECU 30 judges whether a current combustion mode FMODE is zero. The combustion mode FMODE has a value of zero when stratified combustion is performed and has a value of one when uniform charge combustion is performed. If the current combustion mode FMODE is zero, the ECU 30 judges that stratified combustion is currently being performed and proceeds to step 106. At step 106, the ECU 30 substitutes a predetermined time period T0 for a delay time TD. If the current combustion mode FMODE is one, on the other hand, the ECU 30 judges that stratified charge combustion is not being performed and proceeds to step 107. The ECU 30 substitutes a predetermined time period T1 for the delay time TD at step 107. The predetermined time period T1 is shorter than the predetermined time period T0 (T0>T1).

After steps 106 or 107, the ECU 30 moves to step 108. At step 108, the ECU 30 judges whether the current counter value CNDDLY of the delay counter has reached the delay time TD, which was set at steps 106 or 107. If the count value CNDDLY is less than the delay time TD, the ECU 30 temporarily terminates the subsequent processing. If the count value CNDDLY is equal to or greater than the delay time TD, the ECU 30 sets the flag XNSW to zero and temporarily terminates the subsequent processing. Therefore, the "idle up" operation is performed when the selector lever of the automatic transmission 71 is at the drive position.

In the above described flag setting routine, the state of the neutral position signal NSW is detected. If the signal NSW is zero, whether the counter value CNDDLY, which represents the elapsed time period since the signal NSW became zero, has reached the delay time TD is judged. Based on this judgment, the flag XNSW, which indicates whether the "idle up" operation is required, is set to one or zero. The delay time TD is different when stratified charge combustion is performed from when uniform charge combustion is performed.

Steps for controlling the idle speed based on the above described flag XNSW will now be described. FIG. 4 is a flowchart showing an "ISC routine". This routine is an interrupt executed by the ECU 30 at every predetermined crank angle (for example crank angle CA of 180 degrees).

When entering the routine, the ECU 30 determines whether the flag XNSW is zero at step 201. If the flag XNSW is zero, the ECU 30 proceeds to step 202 for performing the "idle up" operation, or for increasing the power of the engine 1. At step 202, the ECU 30 substitutes the sum of a basic idle value DCALB and a predetermined idle up value DE for a required idle value DCAL. The basic idle value DCALB is computed in another routine. The idle up value DE is proportionate to the decrease of the idle speed when the selector lever is shifted from the neutral range to the drive position. The basic idle value DCALB and the idle up value DE are dimensionless numbers (for example, percent). Thus, the required idle value DCAL computed in step 202 is also a dimensionless number.

If the flag XNSW is one at step 201, the ECU 30 judges that the "idle up" operation is not needed and proceeds to step 203. At step 203, the ECU 30 substitutes the basic idle value DCALB for the required idle value DCAL.

After steps 202 or 203, the ECU 30 moves to step 204. At step 204, the ECU 30 judges whether the current combustion mode FMODE is zero. If the combustion mode FMODE is zero, the ECU 30 judges that stratified charge combustion is being performed and proceeds to step 205. At step 205, the ECU 30 multiplies the required idle value DCAL computed in the current routine by a predetermined coefficient KQF. The ECU 30 substitutes the resultant for a fuel injection amount QFISC for the ISC operation. The coefficient KQF is used to convert the required idle value DCAL into the fuel injection amount QFISC for the ISC operation during stratified charge combustion. After step 205, the ECU 30 temporarily terminates subsequent processing. During computation of a final injection amount in another routine, the fuel injection amount QFISC is used as a parameter for controlling the idle speed and is added to a basic injection amount.

If the current combustion mode FMODE is one at step 204, the ECU 30 judges that uniform charge combustion is being performed and moves to the step 206. At step 206, the ECU 30 multiplies the required idle value DCAL computed in the current routine by a predetermined coefficient KQA. The ECU 30 substitutes the resultant for a throttle opening amount QAISC for the ISC operation. The coefficient KQA is used to convert the required idle value DCAL into the throttle opening amount QAISC for the ISC operation during uniform charge combustion. After step 206, the ECU 30 temporarily terminates subsequent processing. During computation of a final throttle opening in another routine, the fuel throttle opening amount QFISC is used as a parameter for controlling the idle speed and is added to a basic throttle opening amount. At this time, the fuel injection is increased in accordance with the increase of the throttle opening amount for maintaining the current air-fuel ratio A/F.

In the above described "ISC routine", the required idle value DCAL that corresponds to the state of the flag XNSW is computed. More specifically, if the flag XNSW is zero, the required idle value DCAL is greater than a required idle value DCAL computed when the flag XNSW is one, and the difference is the amount of the idle up value DE. Also, either the fuel injection amount QFISC for the ISC operation or the throttle opening amount QAISC for the ISC operation is set based on the state of the combustion mode FMODE. That is, if the stratified charge combustion is performed, the fuel injection amount QFISC for the ISC operation is computed to perform the "idle up" operation by increasing the amount of fuel injection. If the uniform charge combustion is performed, on the other hand, the throttle opening amount QAISC for the ISC operation is computed to perform the "idle up" operation mainly by increasing the throttle opening amount (the amount of intake air).

As described above, the flag XNSW is set to zero and the "idle up" operation is performed when the predetermined delay time TD has elapsed after the neutral position signal NSW becomes zero, that is, after the selector lever is shifted to the drive position. When stratified charge combustion is performed, the throttle valve 23 is almost fully opened. Thus, the "idle up" operation is performed not by increasing the intake air amount but by increasing the fuel injection amount. When uniform charge combustion is performed, on the other hand, the opening of the throttle valve 23 is increased for increasing the intake air amount thereby performing the "idle up" operation. Therefore, when performing the "idle up" operation during stratified charge combustion, the increase of the fuel injection amount based on the command for starting the "idle up" operation (the flag XNSW=0) quickly increases the power of the engine 1. Contrarily, when performing the "idle up" operation during uniform charge combustion, there is a time lag between the increase of the throttle opening based on the command for starting the "idle up" operation and the actual increase of the intake air amount entering the combustion chamber 5. This results in a time lag between the command for starting the "idle up" operation and the actual increase of the power of the engine 1.

Figure 5:
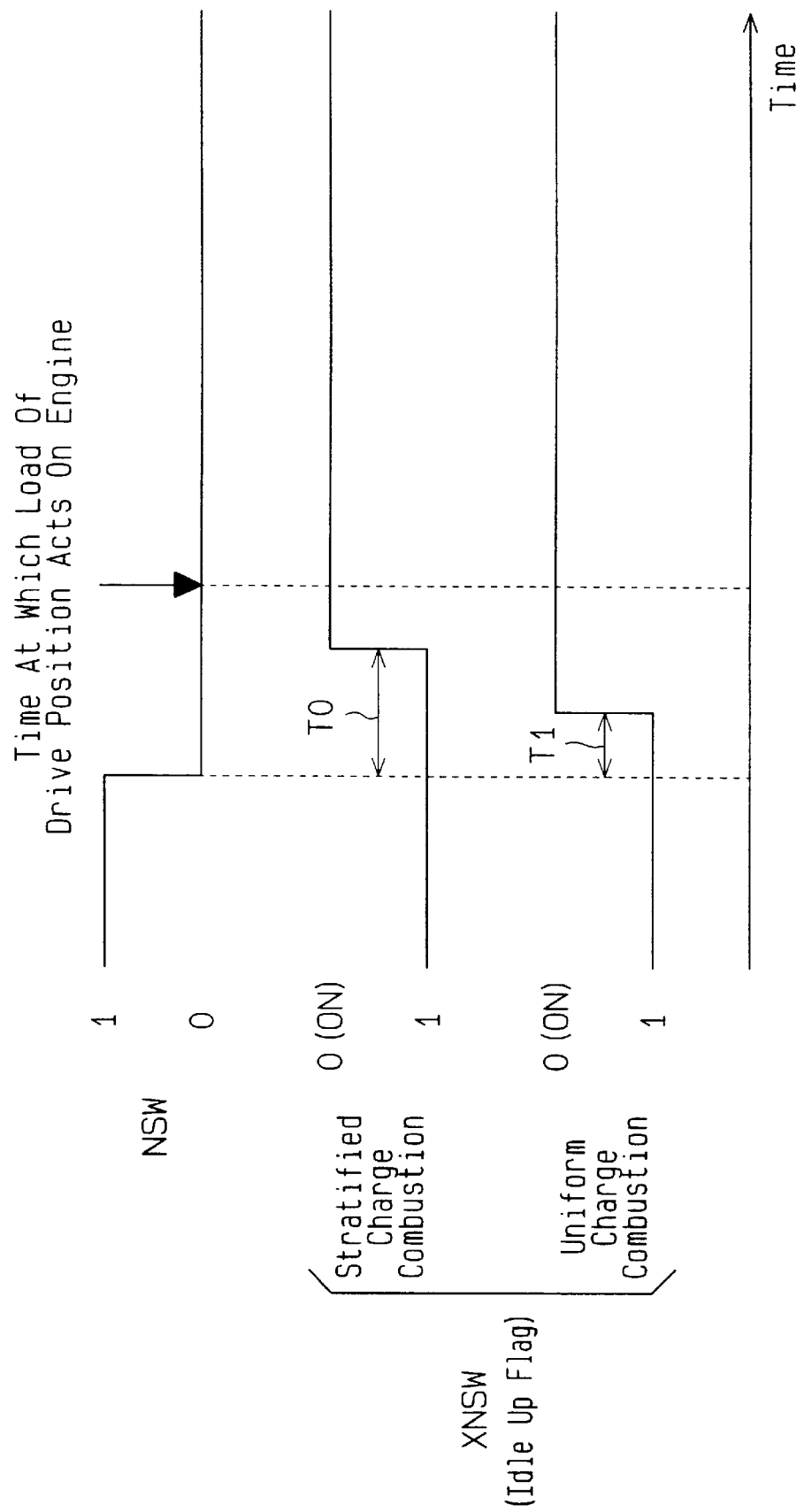
FIG. 5 is a timing chart showing a neutral position signal (NSW) and changes of an "idle up" flag (XNSW) when a stratified charge combustion is performed or when a uniform charge combustion is performed.

In the above embodiment, the delay time TD(T0) used for stratified charge combustion is longer than the delay time TD(T1) used for uniform charge combustion as shown in FIG. 5. Therefore, the time at which the "idle up" operation is commanded during stratified charge combustion is delayed relative to the time at which the "idle up" operation is commanded during the uniform charge combustion. Accordingly, the time period between the command for starting the "idle up" operation and the resulting increase of the engine power is equalized between stratified charge combustion and uniform charge combustion. Thus, the time at which the power of the engine 1 is increased is synchronized with the time at which the load on the engine 1 is increased by shifting the selector lever from the neutral range to the drive position both in stratified charge combustion and uniform charge combustion. As a result, the idle speed of the engine 1 is stabilized and shock and stalling of the engine caused by idle speed fluctuations are prevented.

When stratified charge combustion is performed, the "idle up" operation is executed by increasing the fuel injection amount from the injection valve 11, and when uniform charge combustion is performed, the "idle up" operation is executed by increasing the intake air amount by increasing the throttle opening. The methods for executing the "idle up" operation are basically the same as methods performed by conventional apparatus. Thus, the present invention may be carried out by using the construction of the conventional apparatus.

When controlling the idle speed, the required idle value DCAL, which is a dimensionless number, is used. This allows a single parameter to be used for both fuel injection amount control and throttle opening control. Accordingly, the control program is simplified.

It should be apparent to those skilled in the art that the present invention may be embodied in many other specific forms without departing from the spirit or scope of the invention. Particularly, it should be understood that the invention may be embodied in the following forms.

Figure 6:
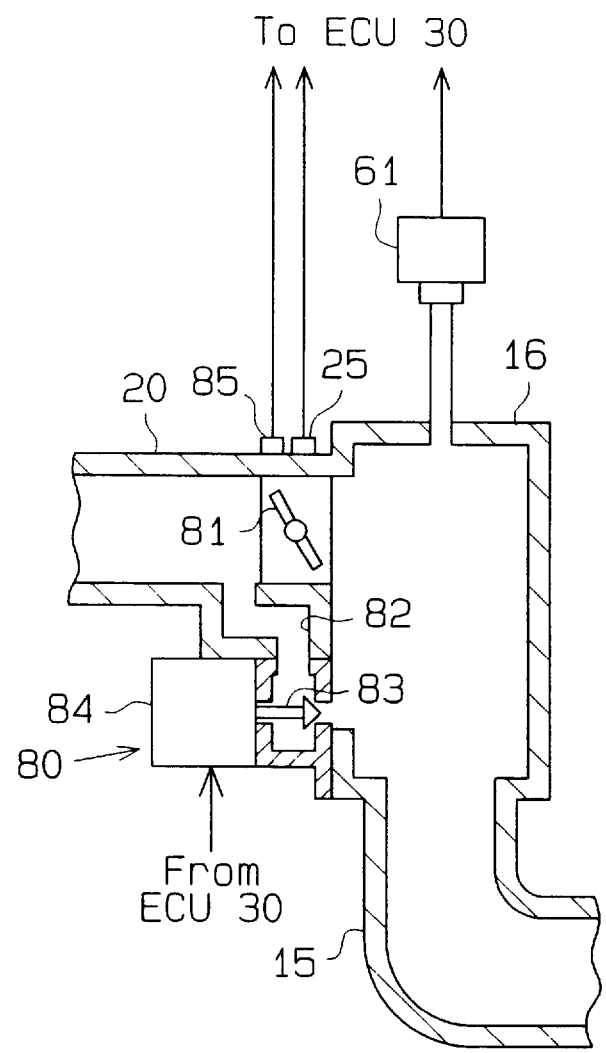
FIG. 6 is a diagrammatic view illustrating a part of an engine according to a second embodiment.

In the embodiment in FIGS. 1–5, the "idle up" operation during uniform charge combustion is performed by an electronically controlled throttle mechanism, which includes the throttle valve 23 located in the intake duct 20 and the step motor 22 for opening and closing the valve 23. However, the "idle up" operation during uniform charge combustion may be performed by an idle speed control (ISC) mechanism 80 illustrated in FIG. 6. The ISC mechanism 80 is not employed in an engine having an electronically controlled throttle mechanism but is employed in an engine having a throttle valve 81 that is operably connected to the acceleration pedal 24 by a cable (not shown). The throttle sensor 25 for detecting the throttle opening TA and an idle switch 85 for detecting that the valve 81 is fully closed (in other words, that the engine 1 is idling) are provided in the vicinity of the throttle valve 81.

The ISC mechanism 80 includes a bypass intake passage 82 bypassing the throttle valve 81, an idle speed control valve (ISCV) 83 located in the passage 82 and an actuator (solenoid) 84 for opening and closing the valve 83. When the idle switch 85 detects that the throttle valve 81 is fully closed (that the engine 1 is idling), the ECU 30 duty controls the solenoid 84 for adjusting the opening of the ISCV 83. This controls the amount of air passing through the bypass passage 82 thereby controlling the amount of intake air entering the combustion chambers. The "idle up" operation during uniform charge combustion is executed by controlling the intake air amount through the ISCV 83. When the engine 1 is idling and the stratified charge combustion is performed, the ISCV 83 is almost fully open.

Further, means for executing the "idle up" operation may be constituted by combining the above described electronically controlled throttle mechanism and the ISC mechanism 80.

In the first embodiment, the required idle value DCAL, which is a dimensionless parameter, is used for controlling both the fuel injection amount and the throttle opening. However, the fuel injection amount and the throttle opening may be controlled with different parameters.

In the first embodiment, the increase of the load on the engine 1 is caused by shifting the selector lever of the automatic transmission 71 from the neutral range to the drive position. However, the present invention may be employed when the load on the engine 1 is increased by starting a vehicle air conditioner or using power steering.

According to the first embodiment, the present invention is employed in a cylinder injection type engine. However, the present invention may be employed in any type of engine as long as the engine performs both stratified charge combustion and uniform charge combustion. For example, the present invention may be employed in an engine in which fuel is injected toward the back faces of the intake valves 6a, 6b for performing stratified charge combustion. Further, in the first embodiment, the fuel injection valve 11 is provided in the vicinity of the intake valves 6a, 6b. However, the valve 11 may be located at any position as long as the valve 11 can directly inject fuel into the combustion chamber 5.

The engine 1 according to the first embodiment includes helical intake ports 7a, 7b, which generate a swirl of intake air. However, a swirl is not required. Therefore, the swirl control valve 17 and the step motor 19 may be omitted.

The first embodiment is employed in the gasoline engine 1. However the present invention may be embodied in a diesel engine.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling idle speed of an internal combustion engine, the engine being able to perform stratified charge combustion, in which the air-fuel ratio varies in the combustion chamber, and uniform charge combustion, in which the air-fuel mixture is uniform in the combustion chamber, a loading mechanism being operably coupled to the engine to selectively load the engine, the controlling apparatus comprising:

supplying means for supplying fuel to the combustion chamber to perform either stratified charge combustion or uniform charge combustion in accordance with the running state of the engine;

increasing means for increasing power of the engine to suppress a decrease in the idle speed of the engine;

detecting means for detecting when the loading mechanism starts to operate while the engine is idling; and controlling means for actuating the increasing means to increase power of the engine after the detecting means detects that the loading mechanism starts operating, wherein the controlling means delays actuating the increasing means during stratified charge combustion relative to a time when it starts actuating the increasing means during uniform charge combustion.

2. The controlling apparatus according to claim 1, wherein the controlling means actuates the increasing means when a predetermined time period has elapsed from when the detecting means detects that the loading mechanism starts operating, and wherein the predetermined time period is longer during stratified charge combustion than during uniform charge combustion.

3. The controlling apparatus according to claim 1, wherein the supplying means includes a fuel injection valve for directly injecting fuel into the combustion chamber, and the fuel injection valve directly injects fuel into the combustion chamber during a compression stroke of the engine for performing stratified charge combustion.

4. The controlling apparatus according to claim 3, wherein the fuel injection valve directly injects fuel into the combustion chamber during an intake stroke of the engine for performing uniform charge combustion.

5. The controlling apparatus according to claim 3, wherein the fuel injection valve functions as the increasing means during stratified charge combustion, and the controlling means increases the amount of fuel injected from the fuel injection valve for increasing power of the engine during stratified charge combustion.

6. The controlling apparatus according to claim 5, wherein the engine comprises:

an intake passage connected to the combustion chamber for supplying air to the combustion chamber;

a throttle valve located in the intake passage for controlling the opening amount of the intake passage, the throttle valve being substantially fully opened during stratified charge combustion.

7. The controlling apparatus according to claim 5 further comprising an adjusting mechanism for adjusting the amount of air supplied to the combustion chamber, the adjusting mechanism functioning as the increasing means during uniform charge combustion, and the controlling means controlling the adjusting mechanism for increasing the amount of air supplied to the combustion chamber thereby increasing power of the engine during uniform charge combustion.

8. The controlling apparatus according to claim 7, wherein the engine comprises an intake passage connected to the combustion chamber for supplying air to the combustion chamber, and the adjusting mechanism comprises:

a throttle valve located in the intake passage for controlling the opening amount of the intake passage; and an actuator for actuating the throttle valve, the controlling means controlling the actuator as necessary during uniform charge combustion.

9. The controlling apparatus according claim 7, wherein the engine comprises an intake passage connected to the combustion chamber for supplying air to the combustion chamber and a throttle valve located in the intake passage for controlling the opening amount of the intake passage, the throttle valve being fully closed when the engine is idling, the adjusting mechanism comprises:

a bypass passage that is connected to the intake passage to bypass the throttle valve;

an idle speed control valve located in the bypass passage for controlling the opening amount of the bypass passage when the engine is idling; and an actuator for actuating the idle speed control valve, the controlling means controlling the actuator as necessary during uniform charge combustion.

10. An apparatus for controlling idle speed of an internal combustion engine, the engine being able to perform stratified charge combustion, in which the air-fuel ratio varies in the combustion chamber, and uniform charge combustion, in which the air-fuel mixture is uniform in the combustion chamber, a loading mechanism being operably coupled to the engine to selectively load the engine, the controlling apparatus comprising:

a fuel injection valve for directly injecting fuel into the combustion chamber to perform either stratified charge combustion or uniform charge combustion in accordance with the running state of the engine, wherein the fuel injection valve directly injects fuel into the combustion chamber during a compression stroke of the engine for performing stratified charge combustion, and wherein the fuel injection valve directly injects fuel into the combustion chamber during an intake stroke of the engine for performing uniform charge combustion;

an adjusting mechanism for adjusting the amount of air supplied to the combustion chamber;

increasing means for increasing power of the engine to suppress a decrease in the idle speed of the engine, wherein the fuel injection valve functions as the increasing means during stratified charge combustion, and wherein the adjusting mechanism functions as the increasing means during uniform charge combustion;

detecting means for detecting when the loading mechanism starts to operate while the engine is idling; and controlling means for actuating the increasing means to increase power of the engine when a predetermined time period has elapsed after the detecting means detects that the loading mechanism has started operating, wherein the controlling means increases the amount of fuel injected from the fuel injection valve during stratified charge combustion and controls the adjusting means to increase the amount of intake air supplied to the combustion chamber during uniform charge combustion, and wherein the predetermined time period is longer during stratified charge combustion than during uniform charge combustion.

11. The controlling apparatus according to claim 10, wherein the engine comprises an intake passage connected to the combustion chamber for supplying air to the combustion chamber, and the adjusting mechanism comprises:

a throttle valve located in the intake passage for controlling the opening amount of the intake passage, the throttle valve being substantially fully opened during stratified charge combustion; and an actuator for actuating the throttle valve, the controlling means controlling the actuator as necessary during uniform charge combustion.

12. The controlling apparatus according to claim 10, wherein the engine comprises an intake passage connected to the combustion chamber for supplying air to the combustion chamber and a throttle valve located in the intake passage for controlling the opening amount of the intake passage, the throttle valve being fully closed when the engine is idling, wherein the adjusting mechanism further comprises:

a bypass passage that is connected to the intake passage to bypass the throttle valve;

an idle speed control valve located in the bypass passage for controlling the opening amount of the bypass passage when the engine is idling, the idle speed control valve being substantially fully opened during stratified charge combustion; and an actuator for actuating the idle speed control valve, the controlling means controlling the actuator as necessary during uniform charge combustion.

13. A method for controlling idle speed of an internal combustion engine, the engine being able to perform stratified charge combustion, in which the air-fuel ratio varies in the combustion chamber, and uniform charge combustion in which the air-fuel mixture is uniform in the combustion chamber, a loading mechanism being operably coupled to the engine to selectively load the engine, the method comprising:

performing either stratified charge combustion or uniform charge combustion in accordance with the running state of the engine;

actuating an increasing means for increasing power of the engine to suppress a decrease in the idle speed of the engine after operation of the loading mechanism is detected while the engine is idling; and delaying actuation of the increasing means during stratified charge combustion relative to that of uniform charge combustion.

* * * * *